(12) United States Patent
Sim et al.

(10) Patent No.: US 8,489,991 B2
(45) Date of Patent: Jul. 16, 2013

(54) SYSTEM AND METHOD FOR VIDEO FRAME MARKING

(75) Inventors: Wong Hoo Sim, Singapore (SG); Tun Keat Foo, Singapore (SG); Jeng Khim Tan, Singapore (SG)

(73) Assignee: Creative Technology Ltd, Singapore (SG)

( * ) Notice: Subject to any disclaimer, the term of this patent is extended or adjusted under 35 U.S.C. 154(b) by 600 days.

(21) Appl. No.: 12/726,189

(22) Filed: Mar. 17, 2010

(65) Prior Publication Data
US 2011/0231765 A1 Sep. 22, 2011

(51) Int. Cl.
*G06F 3/00* (2006.01)
*G06F 3/01* (2006.01)

(52) U.S. Cl.
USPC ........... 715/723; 715/719; 715/720; 715/725; 715/726

(58) Field of Classification Search
USPC ................. 715/719, 720, 723, 724, 725, 726, 715/777, 825
See application file for complete search history.

(56) References Cited

U.S. PATENT DOCUMENTS

| | | | |
|---|---|---|---|
| 7,797,402 B2* | 9/2010 | Roos | 709/219 |
| 7,979,570 B2* | 7/2011 | Chapweske et al. | 709/231 |
| 2007/0157252 A1* | 7/2007 | Perez | 725/61 |
| 2007/0168413 A1* | 7/2007 | Barletta et al. | 709/203 |
| 2007/0250901 A1* | 10/2007 | McIntire et al. | 725/146 |
| 2009/0063419 A1* | 3/2009 | Nurminen et al. | 707/3 |
| 2009/0150557 A1* | 6/2009 | Wormley et al. | 709/231 |
| 2009/0151004 A1* | 6/2009 | Cohen et al. | 726/27 |
| 2009/0158214 A1* | 6/2009 | Arnold et al. | 715/830 |
| 2009/0161994 A1* | 6/2009 | Sauerwein et al. | 382/313 |
| 2009/0327894 A1* | 12/2009 | Rakib et al. | 715/719 |
| 2010/0125791 A1* | 5/2010 | Katis et al. | 715/716 |
| 2010/0220978 A1* | 9/2010 | Ogikubo | 386/95 |
| 2011/0208722 A1* | 8/2011 | Hannuksela | 707/723 |
| 2013/0024550 A1* | 1/2013 | Chapweske et al. | 709/219 |

* cited by examiner

*Primary Examiner* — Nicholas Augustine
(74) *Attorney, Agent, or Firm* — Creative Technology Ltd

(57) ABSTRACT

There is provided a system and method for video frame marking. It is preferable that a tagged video frame is visually perceptible in the set of chronologically ordered video frames shown in the display. The selection of each video frame preferably causes playback of an excerpt of the video with a duration of the common predetermined interval. The video frame may denote a scene from a portion of the excerpt of the video, such as, for example, start, middle and end. It is advantageous that the excerpts of the video of each tagged video frame is combined using the user interface to generate a concise representation of the video. The concise representation of the video may be in a form where excerpts of the video of each of the tagged video frames are played back at a normal rate while excerpts of the video of each of other video frames are played back at an accelerated rate.

11 Claims, 2 Drawing Sheets

SYSTEM AND METHOD FOR VIDEO FRAME MARKING

FIELD OF INVENTION

The present invention relates to a system and a method for marking video frames.

BACKGROUND

A popular recreational activity which people engage in at home is the watching of movies and/or television programs on their television set. Nowadays, the movies/television programs may typically be consumed either from disc media sources (DVD, VCD, Blu-Ray, and so forth), or from streaming content from a content provider. The variety of available movies/television programs is extensive, and it is nearly impossible for a person to watch everything of interest in view of time constraints facing a person engaging in recreational activities. It would thus be desirable if the issue of time constraints could be addressed.

During the consumption of the movies/television programs, it is typical that people enjoy some portions of movies/television programs more than other portions. At the moment, it is necessary to take note of time instances of the enjoyable portions such that it becomes possible to locate the enjoyable portions and by scrolling through the movies/television programs by using a time scale. This is inconvenient in relation to taking note of the enjoyable portions and subsequently locating the enjoyable portions.

In addition, the consumption of movies/television programs is currently a personal endeavour with little input from external parties in relation to the content of the movies/television programs. It would be useful if there was input from external parties in relation to the content of the movies/television programs especially in relation to "must-see" portions of the movies/television programs. Furthermore, having knowledge of "must-see" portions of the movies/television programs would be useful to people who are unable to find sufficient time to consume the movies/television programs in their entirety.

Thus, the present invention aims to both enable convenient access to enjoyable portions of multimedia content and aid people who do not have sufficient time to consume multimedia content in their entirety.

SUMMARY

In a first aspect, there is provided a system for video frame marking. The system includes a display with content showing a set of chronologically ordered video frames from a video in an orderly arrangement, with a time interval between consecutive video frames in the set of chronologically ordered video frames being a common predetermined interval; and a user interface for selecting a video frame on the display and for tagging a video frame of the video with a first frame marker. It is preferable that the tagged video frame is visually perceptible in the set of chronologically ordered video frames shown in the display. It is advantageous that the orderly arrangement allows the set of chronologically ordered video frames to be viewable on the display without any scrolling.

Preferably, the video frame tagged with the first frame marker is incorporated into the set of chronologically ordered video frames when none of the video frames in the set of chronologically ordered video frames is identical to the tagged video frame. The set of chronologically ordered video frames may be generated subsequently from pre-processing of the video. The first frame marker may be a secondary boundary of a video frame.

The selection of each video frame preferably causes playback of an excerpt of the video with a duration of the common predetermined interval. The video frame may denote a scene from a portion of the excerpt of the video, such as, for example, start, middle and end. It is advantageous that the excerpts of the video of each tagged video frame is combined using the user interface to generate a concise representation of the video. The concise representation of the video may be in a form where excerpts of the video of each of the tagged video frames are played back at a normal rate while excerpts of the video of each of other video frames are played back at an accelerated rate.

The content on the display may be accessible by a plurality of users via a network connection.

Advantageously, a popularity of a video frame amongst the plurality of users is visually denoted. The visual denotation of the popularity may be by using indicia. The popularity of the visually denoted video frame may be determined from a tagging count of a video frame by the plurality of users.

It is also advantageous that a video frame without at least one visible feature is replaced with another video frame with at least one visible feature from the excerpt of the video which is played back when the video frame in the without at least one visible feature is selected.

In a second aspect, there is provided a method for video frame marking. The method includes displaying content of a set of chronologically ordered video frames from a video in an orderly arrangement, with a time interval between consecutive video frames in the set of chronologically ordered video frames being a common predetermined interval; perusing the video; tagging a video frame from the video with a first frame marker; incorporating the tagged video frame into the set of chronologically ordered video frames when none of the video frames in the set of chronologically ordered video frames is identical to the tagged video frame; and selecting each video frame to cause playback of an excerpt of the video with a duration of the common predetermined interval. The generating of the set of chronologically ordered video frames may be performed subsequent to pre-processing of the video. The orderly arrangement may allow the set of chronologically ordered video frames to be viewable on the display without any scrolling.

The first frame marker may be a secondary boundary of a video frame. Each video frame may denote a scene from a portion of the excerpt of the video, such as, for example, start, middle and end. The method may further include combining the excerpts of the video of each tagged video frame to generate a concise representation of the video. The concise representation of the video may be in a form where excerpts of the video of each of the tagged video frames are played back at a normal rate while excerpts of the video of each of other video frames are played back at an accelerated rate.

In the method, the content on the display is accessible by a plurality of users via a network connection.

The method may also further include adding an indicia to a video frame to visually denote a popularity of the tagged video frame amongst the plurality of users. The popularity of the video frame may be determined from a tagging count of a video frame by the plurality of users.

BRIEF DESCRIPTION OF THE DRAWINGS

In order that the present invention may be fully understood and readily put into practical effect, there shall now be

DESCRIPTION OF PREFERRED EMBODIMENTS

Figure 1:
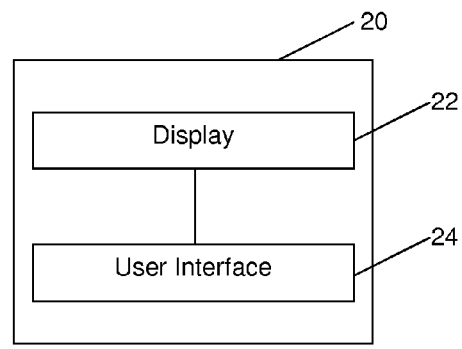
FIG. 1 shows a schematic view of a system of the present invention.
Figure 2:
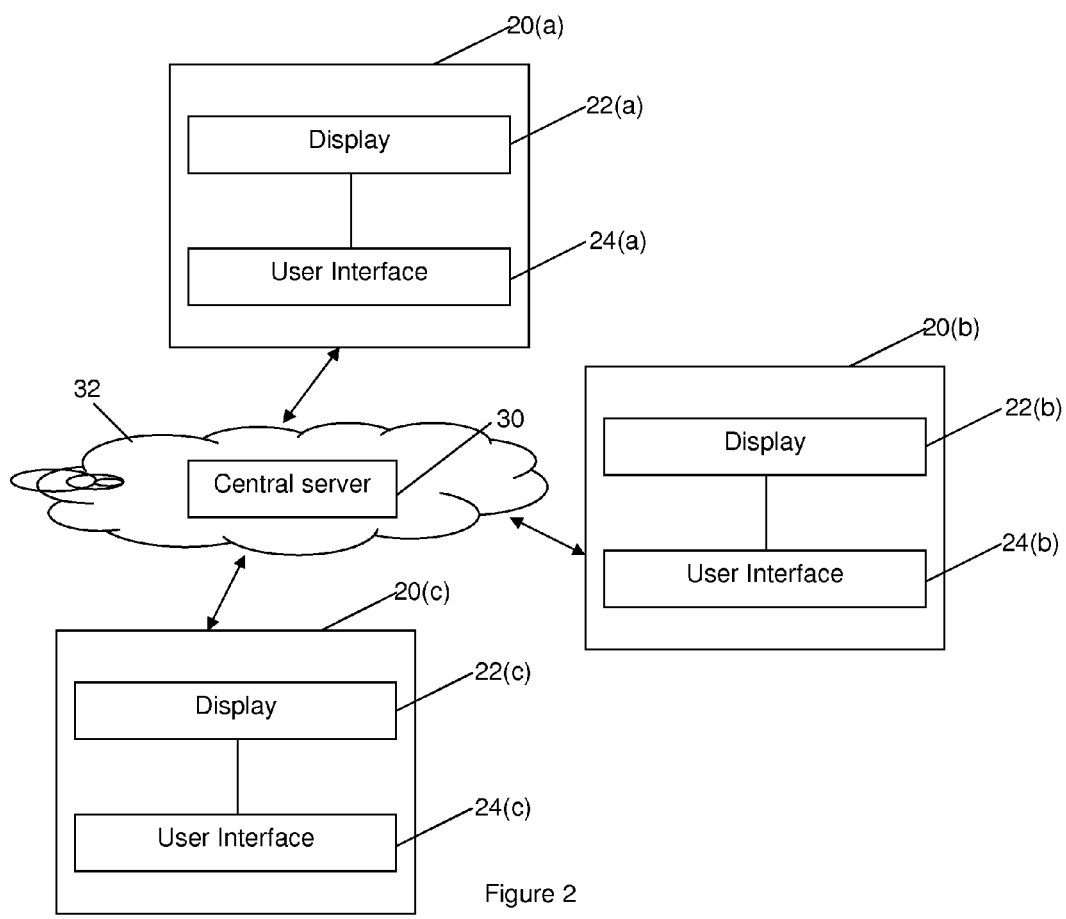
FIG. 2 shows an overview of the system of FIG. 1 being deployed in a network.
Figure 3:
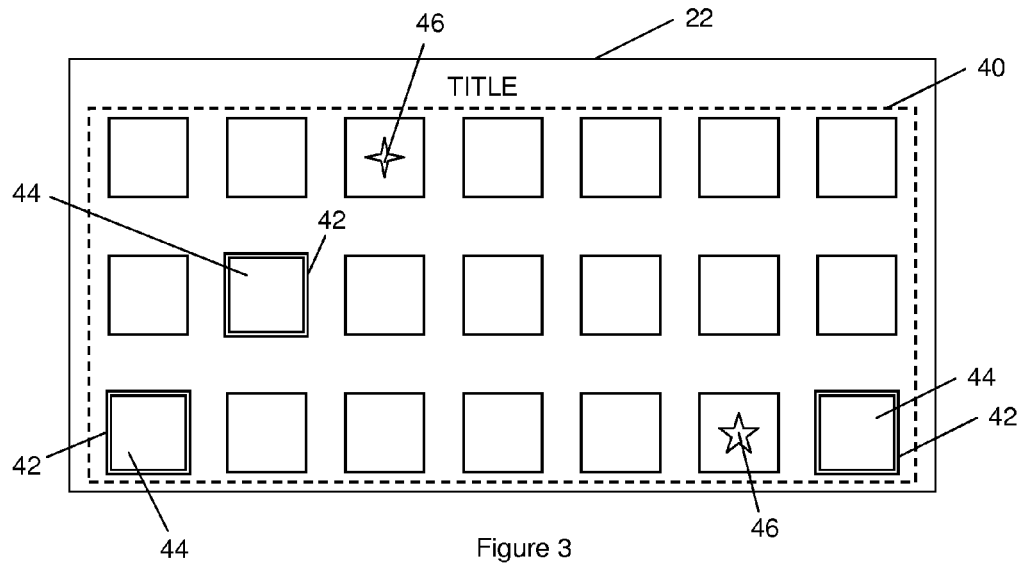
FIG. 3 shows a representation of content shown on a display of the system of FIG. 1.

Referring to FIG. 1, there is provided a schematic view of a system 20 for video frame marking. FIG. 2 shows an overview of the system 20 being deployed in a network. In addition, FIG. 3 shows a non-limiting representation of content presented on a display 22 of the system 20. Repeated references will be made to FIGS. 1-3 when describing the system 20 in subsequent paragraphs of this section.

The system 20 may be used for creating virtual markings on video frames 40 in a manner akin to "bookmarking" the video frames 40 for ease of access to a self-defined portion(s) of a video. The system 20 includes a display 22. The bigger a screen size of the display 22, the better the usability of the system 20. This is because a bigger screen size of the display 22 will correspondingly lead to a more expansive view for contents shown on the display 22, which correspondingly leads to a clearer view for the contents shown on the display 22. The display 22 may present contents showing a set of chronologically ordered video frames 40 from a video in an orderly arrangement, with a time interval between consecutive video frames in the set of chronologically ordered video frames 40 being a common predetermined interval. The set of chronologically ordered video frames 40 is generated subsequently from pre-processing of the video. The pre-processing of the video may include both assessing a duration of the video, and identification of visible features on a frame-by-frame basis for the video. Contents of the video without visible features (eg. frames with a mono-coloured screen) may be marked out such that those frames 40 are not shown on the display 22 as such frames 40 would not be useful when used in the set of chronologically ordered video frames 40 since nothing perceptible can be obtained from viewing such a frame 40.

The time interval between consecutive video frames 40 may range from, for instance, thirty seconds to five minutes. It should be appreciated that the time interval may depend on a duration of the video such that a longer time interval is employed when the video is of a longer duration. FIG. 3 shows a plurality of video frames 40 displayed on the display 22. The orderly arrangement of the video frames 40 may allow the set of chronologically ordered video frames 40 to be viewable on the display 22 without a need for any scrolling. While the plurality of video frames 40 is shown in a grid-like arrangement in FIG. 3, it should not be limited to such an arrangement. Any arrangement of the video frames 40 which allows the set of chronologically ordered video frames 40 to be viewable on the display 22 without a need for any scrolling would be usable.

The system 20 may also include a user interface 24 for selecting a video frame 40 shown on the display 22 and for tagging the video frame 40 of the video with a first frame marker 42. The tagging of the video frame 40 may be carried out with the user interface 24 while perusing contents of the video. The first frame marker 42 may be a secondary boundary of a video frame (as shown in FIG. 3). It should be appreciated that the secondary boundary need not follow a pattern/colour of a perimeter of the tagged video frame 44, and may be in any form which causes the tagged video frame 44 to be noticeable in the display 22 without undue difficulty.

The user interface 24 may be accessible using, for example, gesture recognition, a remote controller, a keyboard, a touch sensitive panel, and so forth. The selection of each video frame 40 using the user interface 24 causes playback of an excerpt of the video with a maximum duration identical to the common predetermined interval. It is appreciated that the video frame 40 denotes a scene from a portion of the excerpt of the video, such as, for example, start, middle or end of the excerpt. In addition, a video frame 40 without at least one visible feature may replaced with another video frame 40 from the excerpt of the video with at least one visible feature.

The video frame 40 tagged with the first frame marker 42 is incorporated into the set of chronologically ordered video frames 40 when none of the video frames 40 in the set of chronologically ordered video frames 40 is identical to the tagged video frame 44. Neighbouring video frames 40 of the incorporated tagged video frame 44 may be deleted to maintain an arrangement of the set of chronologically ordered video frames 40 such that the set of chronologically ordered video frames 40 are viewable on the display 22 without a need for any scrolling.

The tagged video frame 44 is visually perceptible in the set of chronologically ordered video frames 40 shown in the display because of the appearance of the first frame marker 42. It is advantageous that the tagged video frames 44 are visually perceptible as they may represent portions in the video that are "bookmarked" for quick access by the user. These portions in the video may be deemed by the user to be either favourite or important portions of the video. Furthermore, it would be advantageous that the excerpts of the video of each of the tagged video frames 44 are combined using the user interface 24 to generate a concise representation of the video. The combination of the tagged video frames 44 may be in a chronological order. Such a concise representation of the video would include portions which are either a favourite of, or important to the user and would be a time-saving manner of consuming contents of the video since only the user's important/favourite portions of the video are consumed. The concise representation of the video may alternatively also be in a form where excerpts of the video of each of the tagged video frames 44 are played back at a normal rate while excerpts of the video of each of other video frames 40 are played back at an accelerated rate (for example, at least eight times the normal rate). It should be appreciated that the greater the accelerated rate, the more choppy the appearance of the transitioning of the frames in the video excerpt. This alternative form advantageously minimizes confusion of the user viewing the concise representation of the video as the user is typically still able to view the video in an intended sequence, albeit at varying rates throughout the video. The minimisation of confusion may aid in enhancing the user's understanding of the context of the video.

Referring to FIG. 2, in the system 20, the content on the display 22 may be accessible by a plurality of users via a network connection. Three users are shown using a first system 20(a), a second system 20(b) and a third system 20(c) respectively. Each of the aforementioned systems 20(a), 20(b), 20(c) are identical to the system 20 as described in the preceding paragraphs. Each of the aforementioned systems 20(a), 20(b), 20(c) are shown connected to a central server 30 via the internet 32. In this instance, the video may be streamed from the central server 30 to each of the aforementioned systems 20(a), 20(b), 20(c). It should be noted that more than three systems 20 may be connected to the central server 30.

In this instance when the system 20 is connected to the central server 30 via the internet 32, a popularity of the video frame 40 amongst the plurality of users is visually denoted by using indicia 46 (as shown in FIG. 3). The indicia 46 may be overlaid onto the video frame 40 (as shown), or may be located at any position around a perimeter of the video frame 40. When the indicia 46 is overlaid onto the video frame 40, the indicia 46 may be semi-transparent such that a view of the video frame 40 is not hampered by the indicia 46. In FIG. 3, the indicia 46 is represented by both a four pointed star and a five pointed star. In a non-limiting embodiment, the four pointed star may indicate a lower popularity compared to the five pointed star. It should be noted that the popularity of the visually denoted video frame 40 is determined from a tagging count of a video frame 40 by the plurality of users. Thus, the central server 30 collates information from each connected system 20 with regard to the tagged video frames 44 by each user of each system 20 and counts an incidence of tagging for each video frame 40 from amongst the plurality of users in order to obtain the popularity of each video frame 40.

It is advantageous that there are visual denotations of video frames 40 with indicia 46 as they may represent portions in the video that are "bookmarked" for quick access by the plurality of users. These portions in the video may be deemed by the plurality of users to be either favourite or important portions of the video. Furthermore, it would be advantageous that the excerpts of the video of each of the visually denoted video frames 40 is combined using the user interface 24 to generate a concise representation of the video. The combination of the excerpts may be in a chronological order. Such a concise representation of the video would include portions which are either a favourite of, or important to the plurality of users and would be a time-saving manner of consuming contents of the video since only the important/favourite portions of the video as determined by the plurality of users are consumed. The concise representation of the video may alternatively also be in a form where excerpts of the video of each of the tagged video frames 44 are played back at a normal rate while excerpts of the video of each of other video frames 40 are played back at an accelerated rate (for example, at least eight times the normal rate). It should be appreciated that the greater the accelerated rate, the more choppy the appearance of the transitioning of the frames in the video excerpt. This alternative form advantageously minimizes confusion of the user viewing the concise representation of the video as the user is typically still able to view the video in an intended sequence, albeit at varying rates throughout the video. The minimisation of confusion may aid in enhancing the user's understanding of the context of the video.

Figure 4:
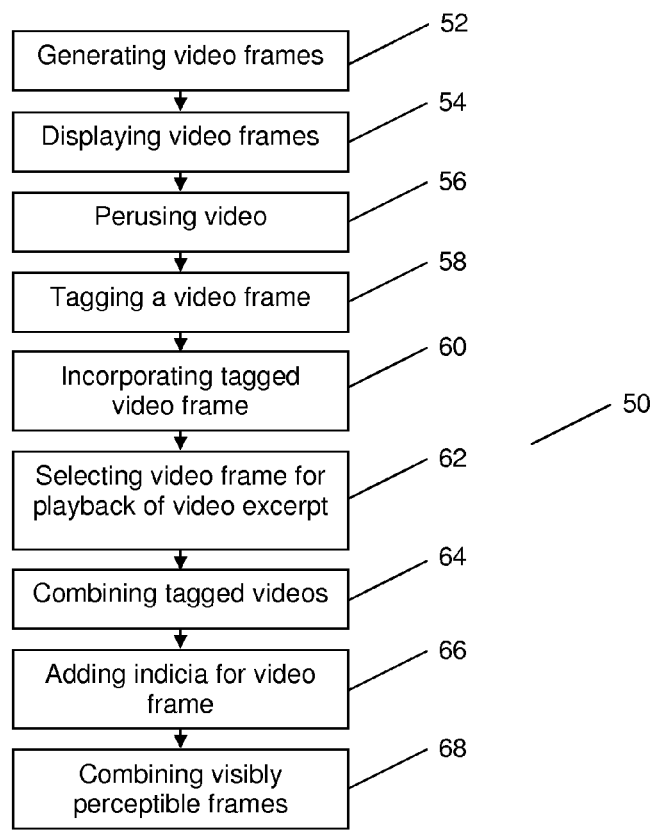
FIG. 4 shows a process flow of a method of the present invention.

Referring to FIG. 4, there is provided a process flow for a method 50 for video frame marking. References will also be made to FIGS. 1-3 when describing the method 50 in subsequent paragraphs of this section.

The method 50 may be used to create virtual markings on video frames 40 in a manner akin to "bookmarking" the video frames 40 for ease of access to a self-defined portion(s) of a video. The method 50 includes generating a set of chronologically ordered video frames 40 (52) subsequent to pre-processing of the video. The pre-processing of the video may include assessing a duration of the video, and identification of visible features on a frame-by-frame basis for the video. Contents of the video without visible features (eg. frames with a mono-coloured screen) may be marked out such that those frames 40 are not shown on the display as such frames would not be useful when used in the set of chronologically ordered video frames 40 since nothing perceptible can be obtained from viewing such a frame 40.

The method 50 also includes displaying content on a display 22 of a set of chronologically ordered video frames 40 from a video in an orderly arrangement (54), with a time interval between consecutive video frames 40 in the set of chronologically ordered video frames 40 being a common predetermined interval. The time interval between consecutive video frames 40 may range from, for instance, thirty seconds to five minutes. It should be appreciated that the time interval may depend on a duration of the video such that a longer time interval is employed when the video is of a longer duration. FIG. 3 shows a plurality of video frames 40 displayed on the display 22. The orderly arrangement of the video frames 40 may allow the set of chronologically ordered video frames 40 to be viewable on the display 22 without a need for any scrolling. While the plurality of video frames 40 is shown in a grid-like arrangement in FIG. 3, it should not be limited to such an arrangement. Any arrangement of the video frames 40 which allows the set of chronologically ordered video frames 40 to be viewable on the display 22 without a need for any scrolling would be usable.

Subsequently, the method 50 also includes perusing of the video (56) by a user. The user may view the video either in its entirety or in a cursory manner. This may depend on an amount of time which the user has to view the video. It will be evident in subsequent paragraphs that the method 50 may aid in saving time for the user in relation to viewing the video.

The method 50 then includes tagging a video frame (58) from the video with a first frame marker 42 by using a user interface 24. The first frame marker 42 may be a secondary boundary of a video frame (as shown in FIG. 3). It should be appreciated that the secondary boundary need not follow a pattern/colour of a perimeter of the tagged video frame 44, and may be in any form which causes the tagged video frame 44 to be noticeable in the display 22 without undue difficulty. The user interface 24 may be accessible using, for example, gesture recognition, a remote controller, a keyboard, a touch sensitive panel, and so forth. The tagged video frame 44 is visually perceptible in the set of chronologically ordered video frames 40 shown in the display because of the appearance of the first frame marker 42. It is advantageous that the tagged video frames 44 are visually perceptible as they may represent portions in the video that are "bookmarked" for quick access by the user. These portions in the video may be deemed by the user to be either favourite or important portions of the video.

There is subsequently an incorporation of the tagged video frame 44 (60) into the set of chronologically ordered video frames when none of the video frames 40 in the set of chronologically ordered video frames 40 is identical to the tagged video frame 44. Neighbouring video frames 40 of the incorporated tagged video frame 44 may be deleted to maintain an arrangement of the set of chronologically ordered video frames 40 such that the set of chronologically ordered video frames 40 are viewable on the display 22 without a need for any scrolling. It is appreciated that the video frame 40 denotes a scene from a portion of the excerpt of the video, such as, for example, start, middle or end of the excerpt. In addition, a video frame 40 without at least one visible feature is replaced with another video frame 40 with at least one visible feature from the excerpt of the video.

The method 50 includes selecting each video frame 40 (62) to cause playback of an excerpt of the video with a duration of the common predetermined interval. There is also a combining of the excerpts of the video of each tagged video frame

(64) to generate a concise representation of the video in the method 50. The combination of the tagged video frames 44 may be in a chronological order. Such a concise representation of the video would include portions which are either a favourite of, or important to the user and would be a time-saving manner of consuming contents of the video since only the user's important/favourite portions of the video are consumed. The concise representation of the video may alternatively also be in a form where excerpts of the video of each of the tagged video frames 44 are played back at a normal rate while excerpts of the video of each of other video frames 40 are played back at an accelerated rate (for example, at least eight times the normal rate). It should be appreciated that the greater the accelerated rate, the more choppy the appearance of the transitioning of the frames in the video excerpt. This alternative form advantageously minimizes confusion of the user viewing the concise representation of the video as the user is typically still able to view the video in an intended sequence, albeit at varying rates throughout the video. The minimisation of confusion may aid in enhancing the user's understanding of the context of the video.

Referring to FIG. 2, in the method 50, the content on the display 22 may be accessible by a plurality of users via a network connection. Three users are shown using a first system 20(a), a second system 20(b) and a third system 20(c) respectively. Each of the aforementioned systems 20(a), 20(b), 20(c) are identical to the system 20 as described in the preceding paragraphs. Each of the aforementioned systems 20(a), 20(b), 20(c) are shown connected to a central server 30 via the internet 32. In this instance, the video may be streamed from the central server 30 to each of the aforementioned systems 20(a), 20(b), 20(c). It should be noted that more than three systems 20 may be connected to the central server 30. It should be noted that the method 50 is carried out at each of the aforementioned systems 20(a), 20(b), 20(c).

In this instance when the system 20 is connected to the central server 30 via the internet 32, a popularity of the video frame 40 amongst the plurality of users is visually denoted by using indicia 46 (as shown in FIG. 3) (66) in the method 50. The indicia 46 may be overlaid onto the video frame 40 (as shown), or may be located at any position around a perimeter of the video frame 40. When the indicia 46 is overlaid onto the video frame 40, the indicia 46 may be semi-transparent such that a view of the video frame 40 is not hampered by the indicia 46. In FIG. 3, the indicia 46 is represented by both a four pointed star and a five pointed star. In a non-limiting embodiment, the four pointed star may indicate a lower popularity compared to the five pointed star. It should be noted that the popularity of the visually denoted video frame is determined from a tagging count of a video frame 40 by the plurality of users. Thus, the central server 30 collates information from each connected system 20 with regard to the tagged video frames 44 by each user of each system 20 and counts an incidence of tagging for each video frame 40 from amongst the plurality of users in order to obtain the popularity of each video frame 40.

It is advantageous that there are visual denotations of video frames 40 with indicia 46 as they may represent portions in the video that are "bookmarked" for quick access by the plurality of users. These portions in the video may be deemed by the plurality of users to be either favourite or important portions of the video. Furthermore, it would be advantageous that the excerpts of the video of each of the visually denoted video frames 40 is combined (68) in the method 50 using the user interface 24 to generate a concise representation of the video. The combination of the excerpts may be in a chronological order. Such a concise representation of the video would include portions which are either a favourite of, or important to the plurality of users and would be a time-saving manner of consuming contents of the video as determined by the plurality of users are consumed. The concise representation of the video may alternatively also be in a form where excerpts of the video of each of the visually denoted video frames 40 are played back at a normal rate while excerpts of the video of each of other video frames 40 are played back at an accelerated rate (for example, at least eight times the normal rate). It should be appreciated that the greater the accelerated rate, the more choppy the appearance of the transitioning of the frames in the video excerpt. This alternative form advantageously minimizes confusion of the user viewing the concise representation of the video as the user is typically still able to view the video in an intended sequence, albeit at varying rates throughout the video. The minimisation of confusion may aid in enhancing the user's understanding of the context of the video.

Whilst there has been described in the foregoing description preferred embodiments of the present invention, it will be understood by those skilled in the technology concerned that many variations or modifications in details of design or construction may be made without departing from the present invention.

The invention claimed is:
1. A system for video frame marking, the system including:
    a display with content showing a set of chronologically ordered video frames from a video in an orderly arrangement, with a time interval between consecutive video frames in the set of chronologically ordered video frames being a common predetermined interval; and
    a user interface for selecting a video frame on the display and for tagging a video frame of the video with a first frame marker,
    wherein the tagged video frame is visually perceptible in the set of chronologically ordered video frames shown in the display,
    wherein the selection of each video frame causes playback of an excerpt of the video with a duration of the common predetermined interval, the excerpts of the video of each tagged video frame are combined using the user interface to generate a concise representation of the video, and
    wherein the concise representation of the video is in a form where excerpts of the video of each of the tagged video frames are played back at a normal rate while excerpts of the video of each of other video frames are played back at an accelerated rate.

2. The system as claimed in claim 1, wherein the video frame tagged with the first frame marker is incorporated into the set of chronologically ordered video frames when none of the video frames in the set of chronologically ordered video frames is identical to the tagged video frame.

3. The system as claimed in claim 1, wherein the set of chronologically ordered video frames is generated subsequently from pre-processing of the video.

4. The system as claimed in claim 1, wherein the first frame marker is a secondary boundary of a video frame.

5. The system as claimed in claim 1, wherein the video frame denotes a scene from a portion of the excerpt of the video, the portion being selected from a group consisting of: start, middle and end.

6. The system as claimed in claim 1, wherein the content on the display is accessible by a plurality of users via a network connection.

7. The system as claimed in claim 6, wherein a popularity of a video frame amongst the plurality of users is visually denoted.

8. The system as claimed in claim 7, wherein the visual denotation of the popularity is by using indicia.

9. The system as claimed in claim 7, wherein the popularity of the visually denoted video frame is determined from a tagging count of a video frame by the plurality of users.

10. The system as claimed in claim 1, wherein the orderly arrangement allows the set of chronologically ordered video frames to be viewable on the display without any scrolling.

11. The system as claimed in claim 1, wherein a video frame without at least one visible feature is replaced with another video frame with at least one visible feature from the excerpt of the video which is played back when the video frame in the without at least one visible feature is selected.

\* \* \* \* \*